(12) United States Patent
Ding et al.

(10) Patent No.: US 9,898,124 B2
(45) Date of Patent: Feb. 20, 2018

(54) TOUCH DISPLAY DEVICE, ITS DRIVING METHOD AND NON-TRANSIENT STORAGE MEDIUM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Tao Ren, Beijing (CN); Shengji Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 290 days.

(21) Appl. No.: 14/387,721

(22) PCT Filed: Dec. 18, 2013

(86) PCT No.: PCT/CN2013/089774
§ 371 (c)(1),
(2) Date: Sep. 24, 2014

(87) PCT Pub. No.: WO2015/027640
PCT Pub. Date: Mar. 5, 2015

(65) Prior Publication Data
US 2016/0018938 A1    Jan. 21, 2016

(30) Foreign Application Priority Data
Aug. 27, 2013 (CN) .......................... 2013 1 0379470

(51) Int. Cl.
*G06F 3/041* (2006.01)
(52) U.S. Cl.
CPC .......... *G06F 3/0416* (2013.01); *G06F 3/0412* (2013.01)

(58) Field of Classification Search
CPC .................................................... G06F 3/0416
See application file for complete search history.

(56) References Cited

U.S. PATENT DOCUMENTS

2008/0062140 A1* 3/2008 Hotelling ............. G09G 3/3648
345/173
2008/0186434 A1* 8/2008 Yun ........................ G02F 1/1362
349/106
(Continued)

FOREIGN PATENT DOCUMENTS

CN          101305338 A         11/2008
CN          102881839 A          1/2013
(Continued)

OTHER PUBLICATIONS

Second Chinese Office Action regarding Application No. 2013103794709 dated May 16, 2016. Translation provided by Dragon Intellectual Property Law Firm.
(Continued)

*Primary Examiner* — Amare Mengistu
*Assistant Examiner* — Shawna Stepp Jones
(74) *Attorney, Agent, or Firm* — Harness, Dickey & Pierce, P.L.C.

(57) ABSTRACT

The present invention relates to the field of display technology, and provides a touch display device and its driving method, so as to increase the time spent for scanning a touch signal. In the method for driving the touch display device, the touch display device comprises n display regions, each of which corresponding to a plurality of rows of pixels, and n is an integer greater than or equal to 2. The method comprises the step of: during a progressive scanning procedure, scanning one of the n display regions and outputting a
(Continued)

display signal to the scanned display region, and at the same time inputting a touch signal to the remaining n−1 display regions that are not scanned.

18 Claims, 3 Drawing Sheets

(56) References Cited

U.S. PATENT DOCUMENTS

| | | | |
|---|---|---|---|
| 2010/0052700 A1* | 3/2010 | Yano | G06F 3/044 |
| | | | 324/658 |
| 2014/0049508 A1* | 2/2014 | Kim | G06F 3/044 |
| | | | 345/174 |
| 2014/0362031 A1* | 12/2014 | Mo | G09G 3/36 |
| | | | 345/174 |

FOREIGN PATENT DOCUMENTS

| | | |
|---|---|---|
| CN | 103092408 A | 5/2013 |
| CN | 103186426 A | 7/2013 |
| CN | 103207720 A | 7/2013 |
| WO | WO-2012-118513 A1 | 9/2012 |

OTHER PUBLICATIONS

First Office Action regarding Chinese application No. 201310379470.9, dated Nov. 5, 2015. Translation provided by Dragon Intellectual Property Law Firm.

Written Opinion of the International Searching Authority for international application No. PCT/CN2013/089774.

Third Office Action regarding Chinese application No. 201310379470.9, dated Oct. 25, 2016. Translation provided by Dragon Intellectual Property Law Firm.

* cited by examiner during a progressive scanning procedure, scanning one of the n display regions and outputting a display signal to the scanned display region, and at the same time inputting a touch signal to one of the remaining n-1 display regions that are not scanned —S101

.# TOUCH DISPLAY DEVICE, ITS DRIVING METHOD AND NON-TRANSIENT STORAGE MEDIUM

CROSS-REFERENCE OF RELATED APPLICATIONS

This application is the U.S. national phase of PCT Application No. PCT/CN2013/089774 filed on Dec. 18, 2013, which claims priority to and incorporates by reference the entire contents of Chinese patent application No. 201310379470.9, filed on Aug. 27, 2013.

FIELD OF THE INVENTION

The present invention relates to the field of display technology, in particular to a touch display device and its driving method.

DESCRIPTION OF THE PRIOR ART

Digital devices have become an indispensable element of our daily life and production. A display device, as a video signal output terminal for the digital device, is used to directly transmit information to an operator, and thus it is indispensable. Along with the development of scientific technologies, the display device can be used not only to receive and display the video signal, but also to input a control command. For an existing touch display device, the command can be directly inputted via a screen, and even input accessories such as a keyboard may be replaced thereby.

The inventor finds that, in the prior art, the touch display device only scans and detects whether or not a touch signal is inputted by a user in the time slot between the refreshing of two frames. However, in such way of detecting the touch signal, it will spend only a little time to scan the touch signal. As a result, sometimes it is impossible for the touch display device to effectively receive the touch signal from the user, and thereby the user experience will be weakened.

SUMMARY OF THE INVENTION

An object of the present invention is to provide a touch display device and its driving method, so as to increase the time for scanning a touch signal.

In order to solve the above mentioned problem, the present invention adopt the following technical solutions:

In one aspect, the present invention provides a method for driving a touch display device including n display regions, each of which corresponding to a plurality of rows of pixels, n being an integer greater than or equal to 2. The method includes the step of:

during a progressive scanning procedure, scanning one of the n display regions and outputting a display signal to the scanned display region, and at the same time, inputting a touch signal to one of the remaining n−1 display regions that are not scanned.

To be specific, when n is an even number, the method includes a step of scanning a first display region of the n display regions, and at the same time inputting the touch signal to a $$\left(\frac{n}{2}+1\right)^{th}$$

display region of the n display regions; and when n is an odd number, the method includes a step of scanning the first display region of the n display regions, and at the same time inputting the touch signal to a $$\left(\frac{n+1}{2}\right)^{th}$$

display region of the n display regions.

The touch display device includes four display regions, i.e., the first display region, a second display region, a third display region and a fourth display region. The method for driving the touch display device includes:

in a first period of time within an identical display cycle, scanning the first display region and outputting the display signal to the first display region, and at the same time, inputting the touch signal to the third display region;

in a second period of time within the identical display cycle, scanning the second display region and outputting the display signal to the second display region, at the same time, inputting the touch signal to the fourth display region;

in a third period of time within the identical display cycle, scanning the third display region and outputting the display signal to the third display region, and at the same time, inputting the touch signal to the first display region; and in a fourth period of time within the identical display cycle, scanning the fourth display region and outputting the display signal to the fourth display region, and at the same time, inputting the touch signal to the second display region.

Preferably, the method further includes, in a period of time where one of the n display regions is scanned and the display signal is outputted to the scanned display region during the progressive scanning procedure, inputting the touch signal to a plurality of continuous display regions of the remaining n−1 display regions that are not scanned.

To be specific, when n is an even number, the method includes a step of scanning the first display region of the n display regions, and at the same time inputting the touch signal to a plurality of continuous display regions of the n display regions starting from the $$\left(\frac{n}{2}+1\right)^{th}$$

display region; and when n is an odd number, the method includes a step of scanning the first display region of the n display regions, and at the same time inputting the touch signal to a plurality of continuous display regions of the n display regions starting from the $$\left(\frac{n+1}{2}\right)^{th}$$

display region.

Preferably, the number of the plurality of continuous display regions is 2.

Preferably, the number n of the display regions is 22 or above, and the number of the plurality of continuous regions is 3 or 4.

The step of, during the progressive scanning procedure, scanning one of the n display regions and outputting the display signal to the scanned display region, and at the same time, inputting the touch signal to the plurality of continuous display regions of the remaining n−1 display regions that are not scanned includes:

if the display region to which the display signal is to be output is identical to the display region to which the touch signal is to be input, outputting the display signal to the display region, and inputting the touch signal to a display region next to the display region; and after the display signal is outputted to the display region, inputting the touch signal to the display region in a next period of time for scanning.

The touch display device includes four display regions, i.e., the first display region, the second display region, the third display region, and the fourth display region. The method for driving the touch display device includes:

in the first period of time within the identical display cycle, scanning the first display region and outputting the display signal to the first display region, and at the same time, sequentially inputting the touch signal to the third display region and the fourth display region;

in the second period of time within the identical display cycle, scanning the second display region and outputting the display signal to the second display region, and at the same time, sequentially inputting the touch signal to the first display region and the third display region;

in the third period of time within the identical display cycle, scanning the third display region and outputting the display signal to the third display region, and at the same time, sequentially inputting the touch signal to the second display region and the fourth display region; and in the fourth period of time within the identical display cycle, scanning the fourth display region and outputting the display signal to the fourth display region, and at the same time, sequentially inputting the touch signal to the first display region and the second display region.

According to the method of the embodiment of the present invention, during the progressive scanning procedure, the touch signal is inputted sequentially to the display regions that are not scanned, so as to acquire a touch operation currently performed by a user on the touch display device. As a result, it is able to increase the time for the touch display device to scan the touch signal, reduce the possibility the touch signal from the user cannot be sensed by the touch display device, and improve the user experience.

In another aspect, the present invention provides a touch display device, including n display regions, each of which corresponding to a plurality of rows of pixels, n being an integer greater than or equal to 2. The touch display device includes a display module and a touch module.

During a progressive scanning procedure, the display module is configured to scan one of the n display regions and output a display signal to the scanned display region, and at the same time the touch module is configured to input a touch signal to one of the remaining n−1 display regions that are not scanned.

To be specific, when n is an even number, the display module scans a first display region of the n display regions, and at the same time, the touch module inputs the touch signal to a $$\left(\frac{n}{2}+1\right)^{th}$$

display region of the n display regions; and when n is an odd number, the display module is configured to scan the first display region of the n display regions, and at the same time the touch module is configured to input the touch signal to a $$\left(\frac{n+1}{2}\right)^{th}$$

display region of the n display regions.

The touch display device includes four display regions, i.e., the first display region, a second display region, a third display region and a fourth display region.

In a first period of time within an identical display cycle, the display module is configured to scan the first display region and output the display signal to the first display region, and at the same time, the touch module is configured to input the touch signal to the third display region.

In a second period of time within the identical display cycle, the display module is configured to scan the second display region and output the display signal to the second display region, and at the same time, the touch module is configured to input the touch signal to the fourth display region.

In a third period of time within the identical display cycle, the display module is configured to scan the third display region and output the display signal to the third display region, and at the same time, the touch module is configured to input the touch signal to the first display region.

In a fourth period of time within the identical display cycle, the display module is configured to scan the fourth display region and output the display signal to the fourth display region, and at the same time, the touch module is configured to input the touch signal to the second display region.

During the progressive scanning procedure, the display module is configured to, in a period of time where one of the n display regions is scanned and the display signal is outputted to the scanned display region, input the touch signal to a plurality of continuous display regions of the remaining n−1 display regions that are not scanned.

To be specific, when n is an even number, the display module is configured to scan the first display region of the n display regions, and at the same time the touch module is configured to input the touch signal to a plurality of the n display regions starting from the $$\left(\frac{n}{2}+1\right)^{th}$$

display region; and when n is an odd number, the display module is configured to scan the first display region of the n display regions, and at the same time the touch module is configured to input the touch signal to a plurality of display regions of the n display regions starting from the $$\left(\frac{n+1}{2}\right)^{th}$$

display region.

Preferably, the plurality of display regions includes 2 display regions.

Preferably, the number n of the display regions is 22 or above, and the number of the plurality of continuous display regions is 3 or 4.

When the display region to which the display signal is to be output is the same as the display region to which the touch signal is to be input, the display module is configured to output the display signal to the display region, and the touch module is configured to input the touch signal to a display region next to the display region. After the display signal is inputted by the display module to the display region, the touch module is configured to input the touch signal to the display region in a next period of time for scanning.

The touch display device includes four display regions, i.e., the first display region, the second display region, the third display region, and the fourth display region.

In the first period of time within the identical display cycle, the display module is configured to scan the first display region and output the display signal to the first display region, and at the same time, the touch module is configured to sequentially input the touch signal to the third display region and the fourth display region.

In the second period of time with the identical display cycle, the display module is configured to scan the second display region and output the display signal to the second display region, and at the same time, the touch module is configured to sequentially input the touch signal to the first display region and the third display region.

In the third period of time in the identical display cycle, the display module is configured to scan the third display region and output the display signal to the third display region, and at the same time the touch module is configured to sequentially input the touch signal to the second display region and the fourth display region.

In the fourth period of time within the identical display cycle, the display module is configured to scan the fourth display region and output the display signal to the fourth display region, and at the same time the touch module is configured to sequentially input the touch signal to the first display region and the second display region.

The display module and/or the touch module include a data line and a shielding layer located above the data line. A fixed voltage is applied to the shielding layer, and the shielding layer is arranged in an identical layer to and insulated from a pixel electrode of the display module.

Furthermore, the present embodiments also provides a non-transient storage medium, which storing a program for driving the touch display device, the touch display device including n display regions, each of which corresponding to a plurality of rows of pixels, n being an integer greater than or equal to 2, the program makes the touch display device execute the following step: during a progressive scanning procedure, scanning one of the n display regions and outputting a display signal to the scanned display region, and at the same time, inputting a touch signal to one of the remaining n−1 display regions that are not scanned.

According to the touch display device of the present invention, during the progressive scanning procedure of the display module, the touch module may sequentially input the touch signal to the display regions that are not scanned, so as to acquire a touch operation currently performed by a user on the touch display device. As a result, it is able to increase the time for the touch display device to scan the touch signal, reduce the possibility the touch signal from the user cannot be sensed by the touch display device, and improve the user experience.

BRIEF DESCRIPTION OF THE DRAWINGS

In order to illustrate the embodiments of the present invention or the technical solutions in the prior art in a clearer manner, the drawings necessary for the description of the embodiments will be described briefly hereinafter. Obviously, the following drawings merely relate to a part of the embodiments of the present invention, and a person skilled in the art, without any creative effort, may obtain the other drawings based thereon.

REFERENCE SIGN LIST

Figures 1, 2:
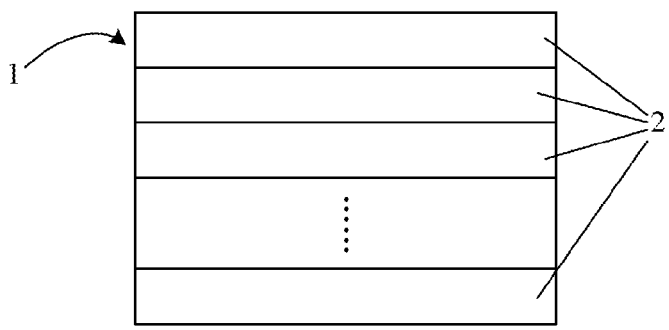
FIG. 1 is the first schematic view showing a touch display device according to one embodiment of the present invention.
FIG. 2 is the first flow chart of a method for driving the touch display device according to one embodiment of the present invention.

1 touch display device
2 display region
3 array substrate
30 first base plate
31 gate insulating layer
32 data line
33 passivation layer
34 pixel electrode
35 shielding layer
36 protective layer
37 common electrode
4 cell-forming substrate
40 second base plate
41 sensing electrode

DETAILED DESCRIPTION OF THE PREFERRED EMBODIMENTS

In the following, the technical solutions of the embodiments of the present invention will be clearly and entirely described with conference to the accompany drawings of the present embodiment. Obviously, all of the embodiments obtained by a person skilled in the art based on the embodiment of the present invention, without any creative effort, may be considered as within the protection scope of the present invention.

As shown in FIG. 1, the present invention provides a method for driving a touch display device including n display regions, wherein n is an integer greater than or equal to 2. To be specific, each of the display regions corresponds to a plurality of rows of pixels. Wherein, each of them may correspond to a plurality of rows of continuous pixels, or pixels at regular intervals. The display regions may be divided in accordance with the practical need.

At this time, as shown in FIG. 2, the method for driving the touch display device includes:

during a progressive scanning procedure, scanning one of the n display regions and outputting a display signal to the scanned display region, and at the same time inputting a touch signal to the remaining n−1 display regions that are not scanned.

In the prior art, the term "progressive scanning" means that, when the display device performs scanning to display an image, it scans the pixels on a screen row by row from the first row, until the entire image has been scanned. In this way, there will be less flickering in the displayed image, and a well display effect will be achieved. Most of the existing display devices use a progressive-scanning mode.

During the progressive scanning procedure, gate lines of the respective rows of pixels in the scanned display region are turned on sequentially, and the touch display device outputs a display signal to the rows of pixels, the gate lines of which are turned on, via a data line. For the rows of pixels in the display regions that are not scanned, the gate lines are all in an off state. As a result, it is able to input a touch signal to one of these display regions that are not scanned, so as to acquire a touch operation currently performed by a user on the touch display device.

Further, in the prior art, it spends more time to scan the display regions and output the display signal thereinto than that spent to input the touch signal to the display regions. A concept of the prevent invention is to, within the period of time required for scanning one display region, sequentially input the touch signal to a plurality of continuous display regions, so as to improve a report rate of the touch display device.

According to the technical solution of this embodiment, during the progressive scanning procedure, the touch signal may be sequentially inputted to the display regions that are not scanned, so as to acquire the touch operation currently performed by the user on the touch display device. As a result, it is able to increase the time for the touch display device to scan the touch signal, and reduce the possibility the touch signal from the user cannot be sensed by the touch display device, thus to improve the user experience.

To be specific, in order to prevent the display effect of the touch display device from being reduced due to the interference between the touch signal and the display signal, the touch signal may be inputted to a display region far away from a first display region when it starts to perform scanning on the touch display regions, i.e., when the first display region in the n display regions is scanned. Preferably, when n is an even number, the touch signal is inputted to a $$\left(\frac{n}{2}+1\right)^{th}$$

display region of the n display regions when the first display region is scanned, and when n is an odd number, the touch signal is inputted to a $$\left(\frac{n+1}{2}\right)^{th}$$

display region of the n display regions when the first display region of the n display regions is scanned. In the case that the touch signal is only inputted to one display region within the period of time for scanning another display region, there is always a distance of half a display screen between the display region that is being displayed and the display region that is being touched. As a result, it is able to minimize the interference between the display signal and the touch signal.

Figure 3:
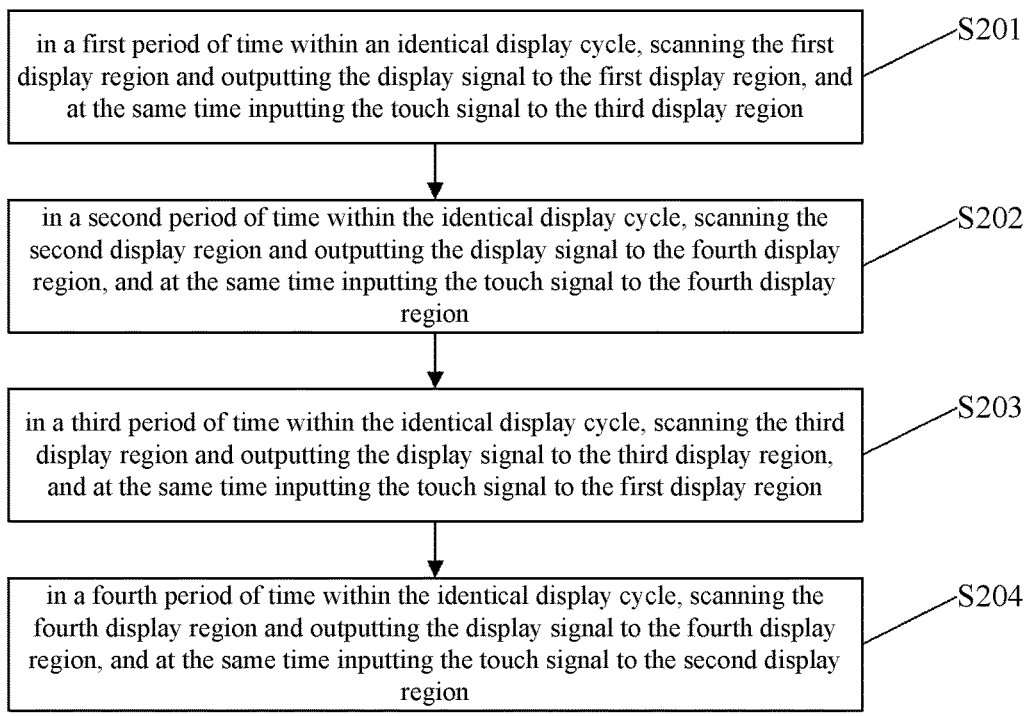
FIG. 3 is the second flow chart of the method for driving the touch display device according to one embodiment of the present invention.

To be specific, the case where the touch signal is only inputted to one display region within the period of time for scanning another display region will be described hereinafter by taking the touch display device 1 including four display regions, i.e., the first display region, a second display region, a third display region and a fourth display region, as an example. At this time, n is 4, i.e., an even number, and when the first display region is scanned, the touch signal is inputted to the third display region. As shown in FIG. 3, the method for driving the touch display device 1 includes the following steps.

Step S201: in a first period of time within an identical display cycle, scanning the first display region and outputting the display signal to the first display region, and at the same time, inputting the touch signal to the third display region.

When an image starts to be displayed, i.e., in the first period of time within the display cycle, the first display region is scanned and the display signal is inputted to the first display region, and at the same time, the touch signal is inputted to the third display region. At this time, the first display region is used for displaying, the third display region is used for touching, and there is a distance of half a display screen between the first display region and the third display region.

As shown in FIG. 3, the method for driving the touch display device also includes the steps of:

Step S202: in a second period of time within the identical display cycle, scanning the second display region and outputting the display signal to the second display region, and at the same time inputting the touch signal to the fourth display region.

In the second period of time after the first period time, the second display region following the first display region is scanned and the display signal is outputted thereto, and at the same time, the touch signal is inputted to the fourth display region following the third display region.

Also, at this time, there is a distance of half a display screen between the second display region for displaying and the fourth display region for touching.

Step S203: in a third period of time within the identical display cycle, scanning the third display region and outputting the display signal to the third display region, and at the same time, inputting the touch signal to the first display region.

In the third period of time after the second period of time, the third display region following the second display region is scanned and the display signal is outputted thereto. Meantime, since the fourth display region to which the touch signal is inputted in the second period of time is the last display region, so in this period of time, the touch signal is inputted to the first display region.

Also, at this time, there is a distance of half a display screen between the third display region for displaying and the first display region for touching.

Step S204: in a fourth period of time within the identical display cycle, scanning the fourth display region and outputting the display signal to the fourth display region, and at the same time, inputting the touch signal to the second display region.

In the fourth period of time after the third period of time, the fourth display region following the third display region is scanned and the display signal is outputted thereto, and at the same time, the touch signal is inputted to the second display region following the first display region for touching in the third period of time.

Also, at this time, there is a distance of half a display screen between the fourth display region for displaying and the second display region for touching.

So far, all the first, second, third and fourth display regions have been used for the displaying, and a frame of image has been displayed, so this display cycle is ended.

Obviously, in the case that the touch signal is only inputted to one display region within the period of time for scanning another display region, if an interval between the display region for displaying and the display region for touching is set in the first period of time, there will be no conflict between the display region for displaying and the display region for touching during the operation of the touch display regions.

In the method for driving the touch display device in FIG. 3, the report rate of the touch signal is the same as a display frequency of the touch display device, i.e., if the display frequency is 60 Hz, the report rate will also be 60 Hz. Further, if the touch signal is sequentially inputted to the remaining, continuous display regions within the period of time required for scanning one display region, the report rate of the touch signal will be improved remarkably.

However, different from that shown in FIG. 3, when the touch signal is sequentially inputted to the remaining, consecutive display regions within the period of time desired for scanning one display region, it will result in a case where the display region for displaying and the display region for touching are an identical one. In this case, the display region for touching shall not be the display region for displaying, so as to prevent the touch signal and the display signal from interfering with each other, thereby to prevent the display effect of the touch display device from being adversely affected.

To be specific, when the display region to which the display signal is to be inputted is identical to the display region to which the touch signal is to be inputted, the display signal is inputted to the display region, and the touch signal is inputted to a display region next to the display region. After the display signal is inputted to the display region, the touch signal is inputted to the display region within a next period of time for scanning. However, at any given time during an identical scanning procedure, i.e., at any given time during the period of time for scanning, the touch signal is merely inputted to one display region. By taking the touch display device including the first, second, third and fourth display regions as an example. In the embodiment, within an identical period of time for scanning one display region, the touch signal is inputted to the remaining, continuous display regions.

Figure 4:
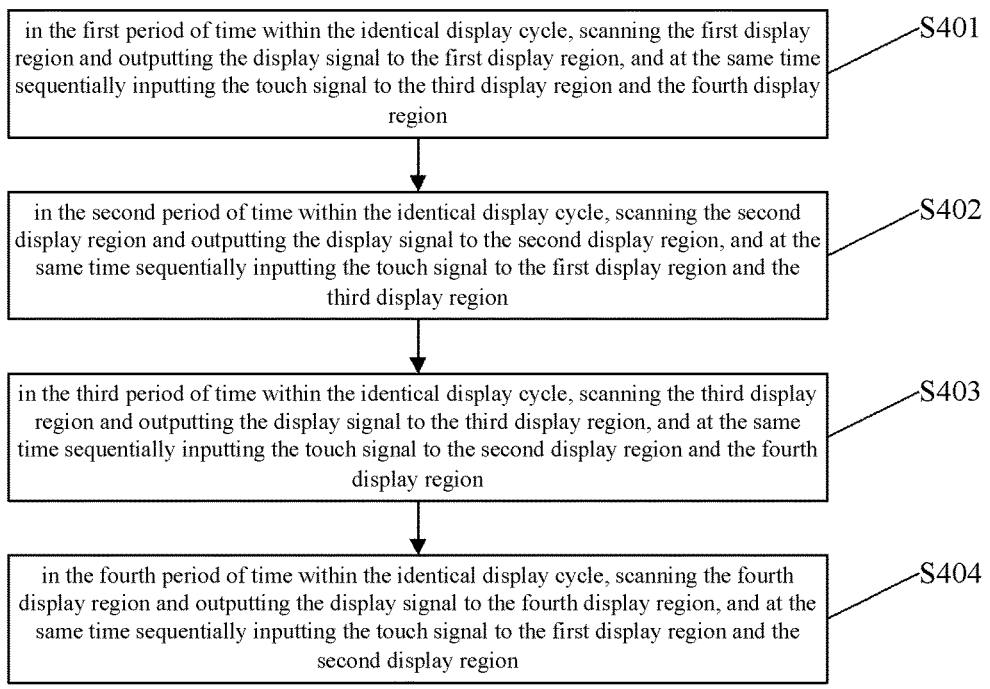
FIG. 4 is the third flow chart of the method for driving the touch display device according to one embodiment of the present invention.

As shown in FIG. 4, the method for driving the touch display device includes the following steps.

Step S401: in the first period of time within the identical display cycle, scanning the first display region and outputting the display signal to the first display region, and at the same time, sequentially inputting the touch signals to the third display region and the fourth display region.

To be specific, when it starts to display the image, i.e., in the first period of time within the display cycle, the first display region is scanned and the display signal is inputted thereto, and at the same time, the touch signal is inputted to the third display region and the fourth display region sequentially. So, in the first period of time, the first display region is always used for displaying, while the third and fourth display regions are sequentially touched.

Step S402: in the second period of time within the identical display cycle, scanning the second display region and outputting the display signal to the second display region, and at the same time, sequentially inputting the touch signal to the first display region and the third display region.

To be specific, in the second period of time after the first period of time, the second display region next to the first display region is scanned and the display signal is inputted thereto. At this time, since the touch signal has been inputted to the third display region and the fourth display region while the first display region is scanned. Therefore, when the second display region is scanned, the touch signal originally should have been inputted to the first and second display regions. However, after the touch signal is inputted to the first display region, since the second display region is still being scanned and the display signal is still being outputted thereto, so it cannot be used for touching at the same time. Hence, the touch signal is inputted to a display region next to the second display region, i.e., the third display region.

Step S403: in the third period of time within the identical display cycle, scanning the third display region and outputting the display signal to the third display region, and at the same time, sequentially inputting the touch signal to the second display region and the fourth display region.

In the second period of time, the second display region cannot be used for both displaying and touching, so the touch signal is inputted to the third display region rather than the second display region. After the second period of time is ended, the second display region has been scanned and the display signal has been outputted thereto, so in the third period of time, the touch signal can be inputted to the second display region so as to drive the second display region to perform the touching.

After the second display region is touched, the touch signal is also inputted to the fourth display region next to the third display region, so as to drive the fourth display region to perform the touching.

Step S404: in the fourth period of time within the identical display cycle, scanning the fourth display region and outputting the display signal to the fourth display region, and at the same time, sequentially inputting the touch signal to the first display region and the second display region.

In the fourth period of time, the fourth display region next to the third display region is scanned and the display signal is outputted thereto. At the same time, the touch signal is inputted to the first display region, and then to the second display region.

Obviously, in the method as shown in FIG. 4, the touch signal is inputted to each display region twice, i.e., two touching operations are performed, so the report rate of the touch signal is double the display frequency. If at this time, the display frequency is 60 Hz, the report rate of the touch signal will be 120 Hz.

In the method as shown in FIGS. 3 and 4, the time required for inputting the touch signal is equal to the time required for inputting the display signal, i.e., the time spent for touching is equal to the time spent for displaying. If the display frequency is 60 Hz, i.e., the time spent for displaying a frame of image is 16.7 ms, the time spent for touching will also be 16.7 ms. As compared with the time of 4 ms spent for touching in each frame of image in the prior art, the time spent for inputting the touch signal and for performing the touch is increased remarkably, thereby it is able to reduce the possibility the touch display device cannot receive the touch signal from the user.

It should be appreciated that, for convenience, the touch display device of this embodiment only includes four display regions. Actually, the number of the display regions of the touch display device may be set in accordance with the practical need, and usually 22 or even more display regions are included. The number of the display regions is not particularly defined herein.

Further, in this embodiment, three, four or more display regions may be selected as the regions to be scanned, and the driving process therefor is similar to that as shown in FIG. 4, which will not be repeated herein.

Figure 5:
FIG. 5 is the second schematic view showing the touch display device according to one embodiment of the present invention.

Correspondingly, the present invention further provides a touch display device. As shown in FIG. 5, the touch display device includes n display regions, each of which corresponding to a plurality of rows of pixels, wherein n is an integer greater than or equal to 2. The touch display device includes a display module and a touch module.

During a progressive scanning procedure, the display module is configured to scan one of the n display regions and output a display signal to the scanned display region, and at the same time the touch module is configured to input a touch signal to one of the remaining n−1 display regions that are not scanned.

During the progressive scanning procedure by the display module, the touch module may sequentially input the touch signal to the display regions that are not scanned, so as to acquire the touch operation currently performed by the user on the touch display device. As a result, it is able to increase the time spent by the touch display device to scan the touch signal, reduce the possibility the touch signal from the user cannot be sensed by the touch display device, and improve the user experience.

To be specific, n may be an even number or an odd number. When n is an even number, the display module is configured to scan a first display region of the n display regions, and at the same time the touch module is configured to input the touch signal to a $$\left(\frac{n}{2}+1\right)^{th}$$

display region of the n display regions; and when n is an odd number, the display module is configured to scan the first display region of the n display regions, and at the same time the touch module is configured to input the touch signal to a $$\left(\frac{n+1}{2}\right)^{th}$$

display region of the n display regions.

To be specific, this will be explained by taking the touch display device including four display regions, i.e. a first display region, a second display region, a third display region and a fourth display region as an example. Here, the report rate of the touch signal is equal to the display frequency of the touch display device, i.e., if the display frequency is 60 Hz, the report rate will be 60 Hz too.

In a first period of time within an identical display cycle, the display module is configured to scan the first display region and output the display signal to the first display region, and at the same time the touch module is configured to input the touch signal to the third display region.

In a second period of time within the identical display cycle, the display module is configured to scan the second display region and output the display signal to the second display region, and at the same time the touch module is configured to input the touch signal to the fourth display region.

In a third period of time within the identical display cycle, the display module is configured to scan the third display region and output the display signal to the third display region, and at the same time the touch module is configured to input the touch signal to the first display region.

In a fourth period of time within the identical display cycle, the display module is configured to scan the fourth display region and output the display signal to the fourth display region, and at the same time the touch module is configured to input the touch signal to the second display region.

Further, within the period of time for scanning one display region, the touch signal may also be inputted to the remaining multiple display regions. However, at any given time during the scanning procedure, i.e., at any given time within the period of time for scanning, the touch signal is only inputted to one display region. To be specific, when the display region to which the display signal is to be outputted is identical to the display region to which the touch signal is to be inputted, the display module outputs the display signal to the display region, and the touch module inputs the touch signal to a display region next to the display region. After the display signal is outputted by the display module to the display region, the touch module inputs the touch signal to the display region in the next period of time for scanning.

The following description is given hereinafter by still taking the touch display device including the first, second, third and fourth display regions as an example. In the period of time for scanning one display region, the touch signal is inputted to the remaining two continuous display regions, so that the report rate of the touch signal is double the display frequency, i.e., if at this time the display frequency is 60 Hz, the report rate of the touch signal will be 120 Hz.

To be specific, in the first period of time within the identical display cycle, the display module scans the first display region and outputs the display signal to the first display region, and at the same time the touch module sequentially inputs the touch signal to the third display region and the fourth display region.

In the second period of time with the identical display cycle, the display module scans the second display region and outputs the display signal to the second display region, and at the same time the touch module sequentially inputs the touch signal to the first display region and the third display region.

In the third period of time in the identical display cycle, the display module scans the third display region and outputs the display signal to the third display region, and at the same time the touch module sequentially inputs the touch signal to the second display region and the fourth display region.

In the fourth period of time within the identical display cycle, the display module scans the fourth display region and outputs the display signal to the fourth display region, and at the same time the touch module sequentially inputs the touch signal to the first display region and the second display region.

Further, the display module and/or the touch module include a data line 32 and a shielding layer 35 located above the data line 32. The shielding layer 35 is coupled to a fixed voltage source, and arranged in an identical layer to and insulated from a pixel electrode 34 of the display module.

Figure 6:
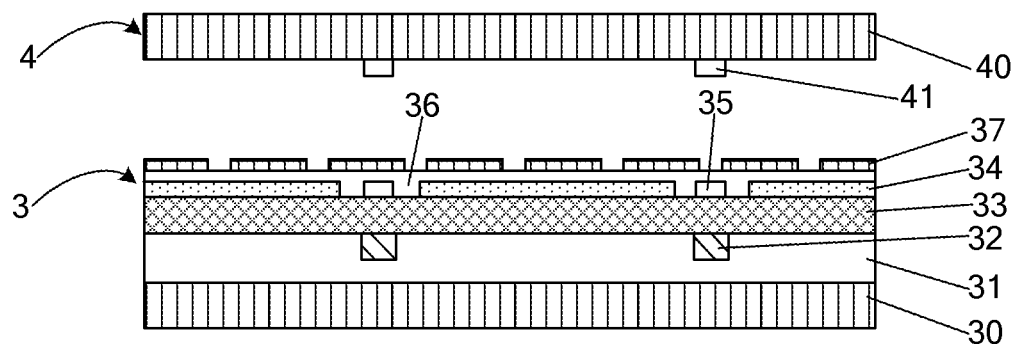
FIG. 6 is a section view of the touch display device according to one embodiment of the present invention.

To be specific, as shown in FIG. 6, the data line 32, the shielding layer 35 and the pixel electrode 34 are all arranged on an array substrate 3.

As shown in FIG. 6, the touch display device further includes a cell-forming substrate 4. A sensing electrode 41 of the touch module is arranged on a base plate 40 of the cell-forming substrate 4 and parallel to the data line 32 on the array substrate 3. The sensing electrode 41 will radiate energy to the outside while acquiring the touch signal. In order to prevent the energy radiated by the sensing electrode 41 from interfering with the data line 32 and adversely affecting the display effect of the touch display device, the shielding layer 35 coupled to the fixed voltage source is arranged above the data line 32, so as to absorb the energy from the sensing electrode 41, thus to prevent the energy radiated by the sensing electrode 41 from interfering with the data line 32.

To be specific, the shielding layer 35 may be arranged in a same layer to the pixel electrode 34 on the array substrate, and it may be formed simultaneously when the pixel electrode 34 is formed by a layout process. Hence, the shielding layer 35 may be made of a transparent conductive material, e.g., ITO, like the pixel electrode 34.

Further, as shown in FIG. 6, at least a gate insulating layer 31, a passivation layer 33, a protective layer 36 and a common electrode 37 may be arranged on the base plate 30 of the array substrate 3. The data line 32 is arranged between the gate insulating layer 31 and the passivation layer 33, and the pixel electrode 34 is arranged between passivation layer 33 and the protective layer 36. The common electrode 37 is a slit electrode, and may cooperate with the sensing electrode 41 so as to sense a position where the touch operation is performed by the user.

Meanwhile, a multidimensional electric field is formed by electric fields generated at edges of the common electrodes 37 and electric fields generated by the cooperation of the common electrodes 37 and the pixel electrodes 34 within an identical plane, so as to rotate all alignment liquid crystal molecules between the common electrodes 37 and right above the common electrodes 37 in the touch display device, thereby to provide an ideal display effect.

The above are merely the preferred embodiments of the present invention, and the present invention is not limited thereto. Obviously, a person skilled in the art may make further modifications and substitutions without departing from the scope of the present invention, and these modifications and substitutions shall also fall within the scope of the present invention. Hence, the scope of the present invention shall be subject to the scope of the appended claims.

What is claimed is:

1. A method for driving a touch display device comprising n display regions, corresponding to a plurality of rows of pixels, n being an integer greater than or equal to 2, the method comprising:
   during a progressive scanning procedure, scanning one of the n display regions and outputting a display signal to the scanned display region when inputting a touch signal to one of the remaining n−1 display regions that are not scanned; and
   inputting, when one of the n display regions is scanned and the display signal is outputted to the scanned display region during the progressive scanning procedure, the touch signal to a plurality of continuous display regions of the remaining n−1 display regions that are not scanned,
   wherein:
      in the case that n is en even number, scanning a first display region of the n display regions when inputting the touch signal to a plurality of continuous display regions of the n display regions starting from a $$\left(\frac{n}{2}+1\right)^{th}$$

display region, and
      in the case that n is an odd number, scanning the first display region of the n display regions when inputting the touch signal to a plurality of continuous display regions of the n display regions starting from a $$\left(\frac{n+1}{2}\right)^{th}$$

display region.

2. The method according to claim 1, wherein the method comprises:
   in the case that n is an even number, scanning the first display region of the n display regions when inputting the touch signal to the $$\left(\frac{n}{2}+1\right)^{th}$$

display region of the n display regions; and
   in the case that n is an odd number, scanning the first display region of the n display regions when inputting the touch signal to the $$\left(\frac{n+1}{2}\right)^{th}$$

display region of the n display regions.

3. The method according to claim 2, wherein the touch display device includes a first display region, a second display region, a third display region, and a fourth display region and the method comprises:
   in a first period of time within an identical display cycle, scanning the first display region and outputting the display signal to the first display region when inputting the touch signal to the third display region;
   in a second period of time within the identical display cycle, scanning the second display region and outputting the display signal to the second display region when inputting the touch signal to the fourth display region;
   in a third period of time within the identical display cycle, scanning the third display region and outputting the display signal to the third display region when inputting the touch signal to the first display region; and
   in a fourth period of time within the identical display cycle, scanning the fourth display region and outputting the display signal to the fourth display region when inputting the touch signal to the second display region.

4. The method according to claim 1, wherein the number of the plurality of continuous display regions is 2.

5. The method according to claim 4, wherein the touch display device includes the first display region, a second display region, a third display region, and a fourth display region and the method comprises:
   in a first period of time within an identical display cycle, scanning the first display region and outputting the display signal to the first display region when sequentially inputting the touch signal to the third display region and the fourth display region;
   in a second period of time within the identical display cycle, scanning the second display region and outputting the display signal to the second display region when sequentially inputting the touch signal to the first display region and the third display region;
   in a third period of time within the identical display cycle, scanning the third display region and outputting the display signal to the third display region when sequentially inputting the touch signal to the second display region and the fourth display region; and in a fourth period of time within the identical display cycle, scanning the fourth display region and outputting the display signal to the fourth display region when sequentially inputting the touch signal to the first display region and the second display region.

6. The method according to claim 1, further comprising: when the display region to which the display signal is to be output is identical to the display region to which the touch signal is to be input, outputting the display signal to the display region, and inputting the touch signal to a display region next to the display region; and after the display signal is outputted to the display region, inputting the touch signal to the display region in a next period of time for scanning.

7. The method according to claim 6, wherein the plurality of continuous display regions include 3 or 4 display regions.

8. The method according to claim 1, wherein the number of the display regions is equal to or greater than 22.

9. A touch display device comprising:
n display regions, each of which corresponds to a plurality of rows of pixels, n being an integer greater than or equal to two;
a display module; and
a touch module,
wherein:
the display module is configured to, during a progressive scanning procedure, scan one of the n display regions and output a display signal to the scanned display region,
the touch module is configured to, during the progressive scanning procedure, input a touch signal to a plurality of continuous display regions of the remaining n−1 display regions that are not scanned when the display module outputs the display signal to the scanned display region,
in the case that n is an even number, the display module is configured to scan a first display region of the n display regions when the touch module inputs the touch signal to the plurality of continuous display regions of the n display regions starting from a $$\left(\frac{n}{2}+1\right)^{th}$$

display region, and
in the case that n is an odd number, the display module is configured to scan the first display region of the n display regions when the touch module inputs the touch signal to the plurality of continuous display regions of the n display regions starting from a $$\left(\frac{n+1}{2}\right)^{th}$$

display region.

10. The touch display device according to claim 9, wherein:
in the case that n is an even number, the display module is configured to scan the first display region of the n display regions when the touch module inputs the touch signal to the $$\left(\frac{n}{2}+1\right)^{th}$$

display region of the n display regions; and
in the case that n is an odd number, the display module is configured to scan the first display region of the n display regions when the touch module inputs the touch signal to the $$\left(\frac{n+1}{2}\right)^{th}$$

display region of the n display regions.

11. The touch display device according to claim 10, wherein:
the touch display device includes the first display region, a second display region, a third display region, and a fourth display region,
in a first period of time within an identical display cycle, the display module is configured to scan the first display region and output the display signal to the first display region when the touch module inputs the touch signal to the third display region,
in a second period of time within the identical display cycle, the display module is configured to scan the second display region and output the display signal to the second display region when the touch module inputs the touch signal to the fourth display region,
in a third period of time within the identical display cycle, the display module is configured to scan the third display region and output the display signal to the third display region when the touch module inputs the touch signal to the first display region, and
in a fourth period of time within the identical display cycle, the display module is configured to scan the fourth display region and output the display signal to the fourth display region when the touch module inputs the touch signal to the second display region.

12. The touch display device according to claim 9, wherein the plurality of continuous display regions include 2 display regions.

13. The touch display device according to claim 12, wherein:
the touch display device includes the first display region, a second display region, a third display region, and a fourth display region,
in a first period of time within an identical display cycle, the display module is configured to scan the first display region and output the display signal to the first display region when the touch module sequentially inputs the touch signal to the third display region and the fourth display region,
in a second period of time with the identical display cycle, the display module is configured to scan the second display region and output the display signal to the second display region when the touch module sequentially inputs the touch signal to the first display region and the third display region,
in a third period of time in the identical display cycle, the display module is configured to scan the third display region and output the display signal to the third display region when the touch module sequentially inputs the touch signal to the second display region and the fourth display region, and in a fourth period of time within the identical display cycle, the display module is configured to scan the fourth display region and output the display signal to the fourth display region when the touch module sequentially inputs the touch signal to the first display region and the second display region.

14. The touch display device according to claim 9, wherein when the display region to which the display signal is to be output is identical to the display region to which the touch signal is to be input, the display module is configured to output the display signal to the display region, and the touch module is configured to input the touch signal to a display region next to the display region, and after the display signal is outputted by the display module to the display region, the touch module is configured to input the touch signal to the display region in a next period of time for scanning.

15. The touch display device according to claim 9, wherein the display module and/or the touch module include a data line and a shielding layer located above the data line, and a fixed voltage is applied to the shielding layer, and the shielding layer is arranged in an identical layer to and insulated from a pixel electrode of the display module.

16. The touch display device according to claim 9, wherein the number of the display regions is equal to or greater than 22.

17. The touch display device according to claim 16, wherein the plurality of continuous display regions include 3 or 4 display regions.

18. A non-transient storage medium storing a program for driving a touch display device, the touch display device including n display regions, each of which corresponds to a plurality of rows of pixels, n being an integer greater than or equal to 2, the program causes the touch display device to execute the following step:

during a progressive scanning procedure, scanning one of the n display regions and outputting a display signal to the scanned display region when inputting a touch signal to one of the remaining n−1 display regions that are not scanned; and inputting, when one of the n display regions is scanned and the display signal is outputted to the scanned display region during the progressive scanning procedure, the touch signal to a plurality of continuous display regions of the remaining n−1 display regions that are not scanned, and wherein:

in the case that n is an even number, scanning a first display region of the n display regions when inputting the touch signal to the plurality of continuous display regions of the n display regions starting from a $$\left(\frac{n}{2}+1\right)^{th}$$

display region; and in the case that n is an odd number, scanning the first display region of the n display regions when inputting the touch signal to the plurality of continuous display regions of the n display regions starting from a $$\left(\frac{n+1}{2}\right)^{th}$$

display region.

* * * * *